Dec. 8, 1931. R. W. CANFIELD 1,835,758
METHOD OF AND APPARATUS FOR MAKING GLASSWARE
Filed June 8, 1928 3 Sheets-Sheet 1

Witness,
Winslow B. Thayer

Inventor;
Robert W. Canfield
by Robson D Brown
Attorney

Dec. 8, 1931.    R. W. CANFIELD    1,835,758
METHOD OF AND APPARATUS FOR MAKING GLASSWARE
Filed June 8, 1928    3 Sheets-Sheet 2
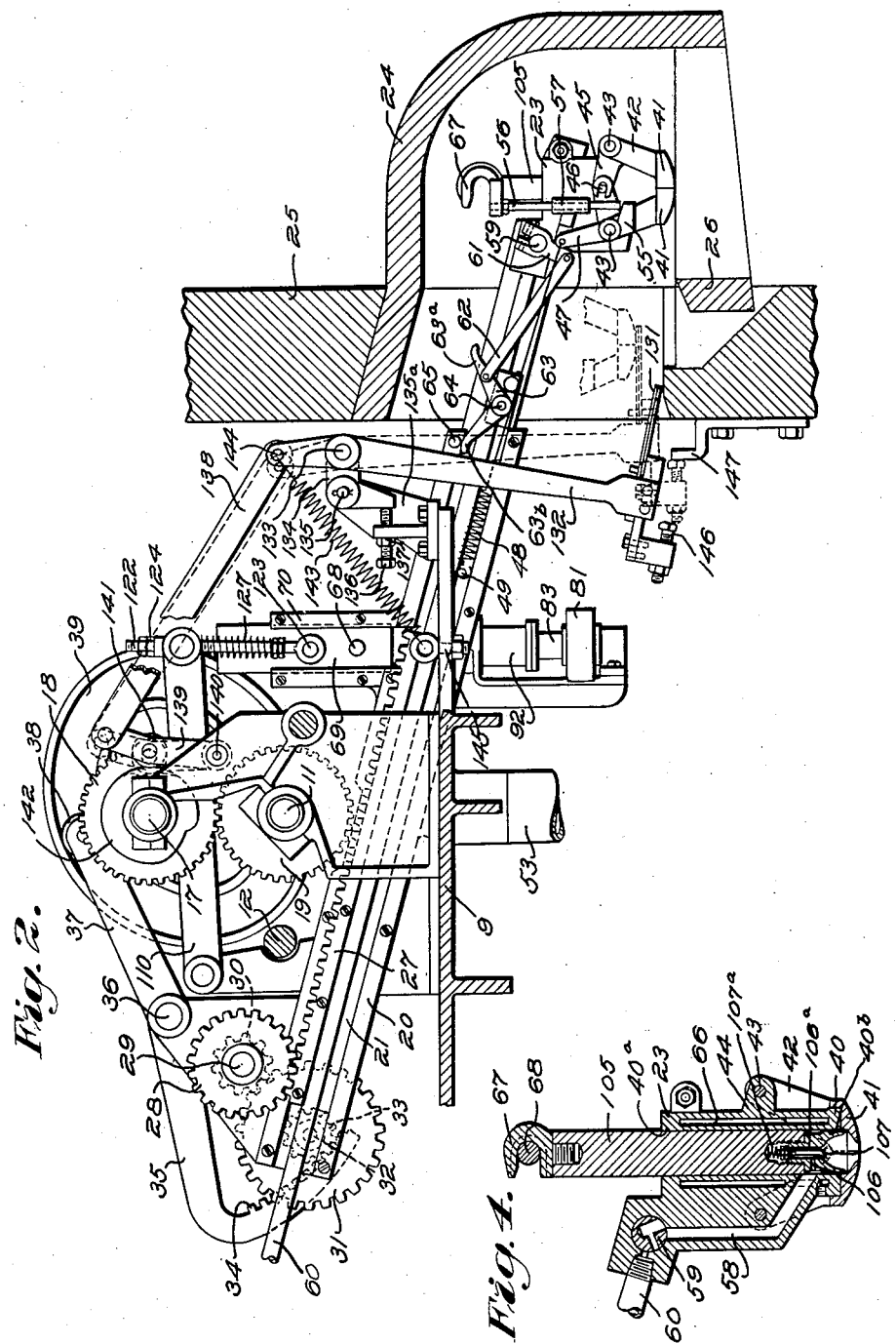
Witness.
Winslow B. Thayer
Inventor;
Robert W. Canfield
by Robson D Brown.
Attorney.

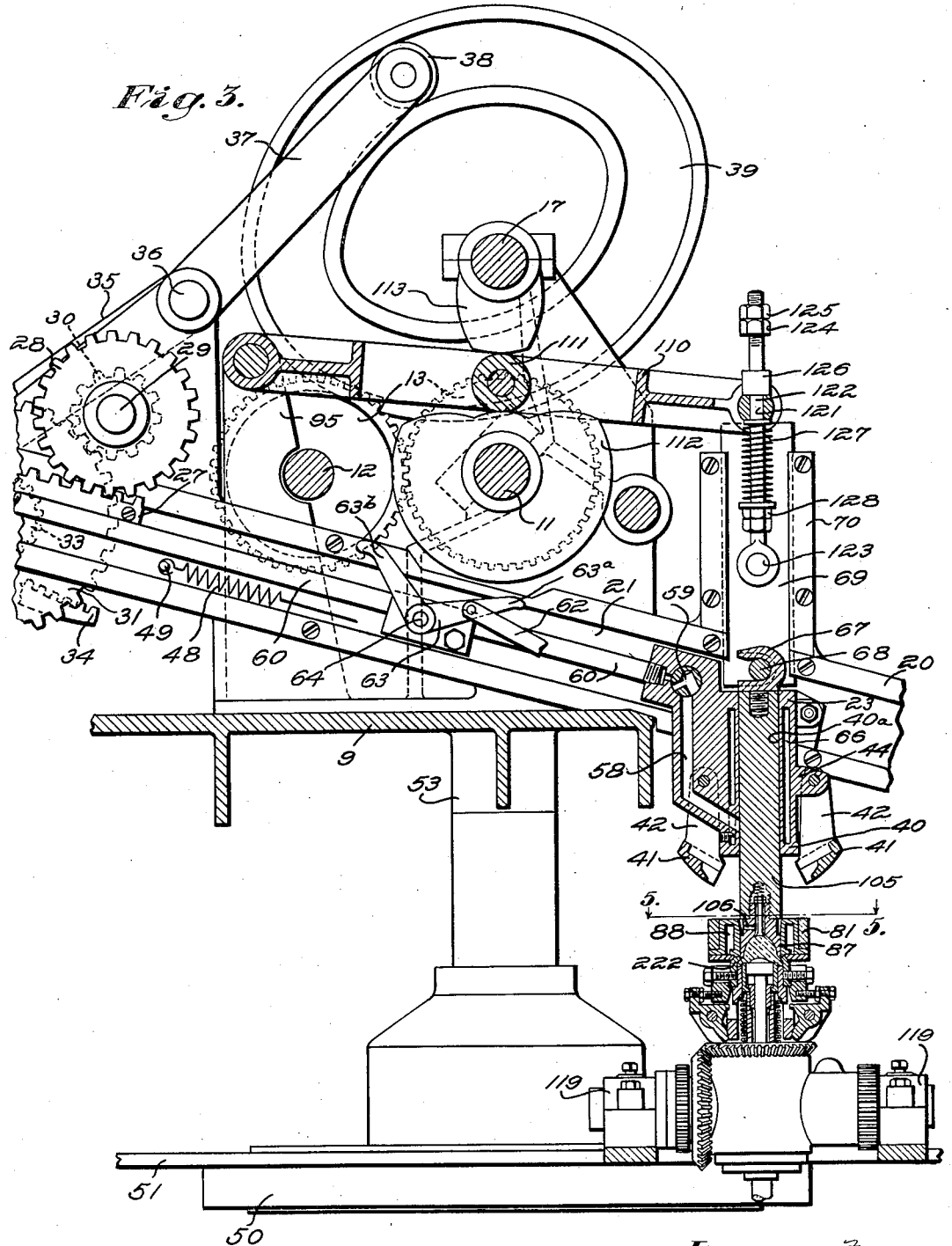

Patented Dec. 8, 1931

1,835,758

UNITED STATES PATENT OFFICE

ROBERT W. CANFIELD, OF WEST HARTFORD, CONNECTICUT, ASSIGNOR TO HARTFORD-EMPIRE COMPANY, OF HARTFORD, CONNECTICUT, A CORPORATION OF DELAWARE

METHOD OF AND APPARATUS FOR MAKING GLASSWARE

Application filed June 8, 1928. Serial No. 283,748.

This invention relates to glassware forming machinery, and more particularly to a machine adapted to gather its own charge by suction from a glass supply and to perform a pressing or a press and blow operation upon that charge. It is particularly adapted for use in connection with machines of the type shown in the U. S. Patent No. 1,609,691, issued December 7, 1926 to the Hartford-Empire Company as assignee of the present applicant, and when used in connection with such a glass-forming machine combines with the charge-gathering device, the pressing feature of the device of the patent.

Among the objects of the invention is to provide a machine of unitary construction capable of collecting its own charges in a rapid and effective manner, and while collecting charges imparting thereto a preliminary configuration suitable to the formation of the ware ultimately to be made. Particularly I employ a portion of the charge-collecting mechanism in the later ware-forming operations to the end that harmful contact of the glass with a succession of instrumentalities may be avoided and the heat condition of the charges maintained most suitable for the forming operations.

The invention provides a method by which glass may be gathered by suction from the furnace and pressed in the same instrumentality in which the gathering has been accomplished, and obviously presents a desirable new method of forming pressed or pressed and blown ware not heretofore practiced.

When my invention is applied to the manufacture of pressed and blown ware, I prefer, as above stated, to combine it with mechanism shown in the aforementioned Patent No. 1,609,691. Generally, the apparatus shown and described in that patent comprises a plurality of sub-units mounted on an automatically rotating spider and successively brought into charge receiving position. Each sub-unit is provided with a glass carrying spindle. After a glass carrying spindle receives its charge of glass, a plunger is brought into cooperative relation therewith to form a blank mold. The plunger is then removed, the blank is reheated, puff blown, inverted, given a preliminary blowing, a finish mold is brought into position, final blowing takes place, and the finished ware is ejected. During the successive operations, the unit is carried around on the rotating table through substantially 360°, ejection of the ware taking place shortly prior to a second arrival of the unit at the charging station, so that on arrival thereat, it is ready for another charge and another cycle of operations.

In order to more clearly explain the invention, one embodiment thereof is shown in the accompanying drawings, in which:—

Fig. 2 is an elevation of a portion of the machine and showing the glass transferring means in glass gathering position;

Fig. 3 is an enlarged sectional elevation on the line 3—3 of Fig. 1 and shows the glass transferring means in glass delivering and pressing position;

Fig 4 is a detailed sectional elevation of the suction gathering mechanism with the lower portion of the gathering mold or receptacle closed.

Figures 1, 5:
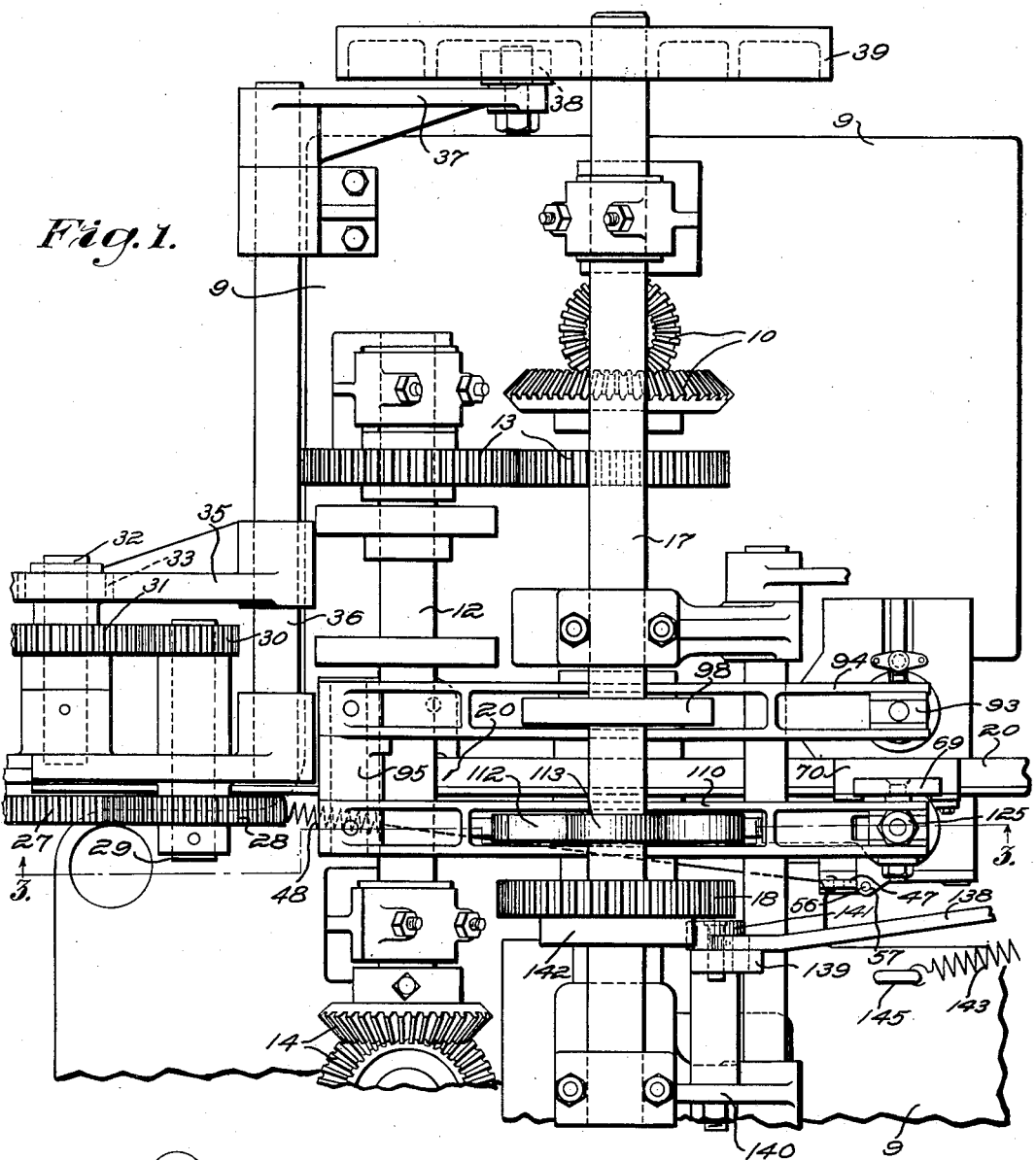
Figure 1 is a plan view of a portion of a glass forming machine of the Patent No. 1,609,691 and additional structure embodying the invention.
Fig. 5 is a horizontal section on the line 5—5 of Fig. 3.

The glass working machine, portions of which are shown in these drawings and in connection with which the present invention is illustrated, is more fully described.in U. S. Patent No. 1,609,691 issued on December 7, 1926 to the Hartford-Empire Co. as assignee of the present applicant, to which patent reference is made for a more detailed description of those parts which are not essential to an understanding of the present invention, but which may be of assistance to those desirous of studying the invention in its relation to a complete machine. Reference is also made to U. S. Patent No. 1,-260,637, issued March 26, 1918 to the Empire Machine Co. as assignee of the present applicant which also shows a machine to which the present invention may readily be applied.

In the drawings, 9 represents the frame of a glass working machine supported by a column 53. The column 53 has an enlarged lower portion or base 50 in the form of a bearing surface on which is rotatably mounted a spider 51, Fig. 3. On the spider there may be mounted a plurality of spindles, each spindle being journaled in a pair of bearings 119. At the upper end of the spindle, there is provided a blank pressing mold with a neck ring 222.

A horizontal shaft 11 is mounted in brackets extending upward from the frame 9 and is continuously driven by suitable gearing 10. A second horizontal shaft 12 is disposed parallel to and in front of the shaft 11 and is driven from the shaft 11 by gearing 13. The shaft 12 operates the spider rotating means which is more fully described in the hereinbefore mentioned Patent No. 1,609,691, through miter gearing 14.

Above the shaft 11 is positioned a horizontal shaft 17 to which is secured a gear 18 which in turn is driven by gear 19. Gear 19 is mounted on a sleeve on the shaft 11 and during operation is connected to the shaft 11 and is driven thereby.

An inclined guide 20 is mounted on the frame 9 and carries therein a slide or ram 21. To the slide 21 is fastened, in any suitable manner, a suction gatherer designated generally by the reference numeral 23. Fig. 2 shows this gathering mechanism 23 at its extreme position to the right within a boot 24 which extends into a glass melting furnace 25. The reference character 26 indicates a lip of refractory material which extends across the front of the opening to the furnace and prevents the chilled glass severed by the shears from passing directly into the region from which the next gather is taken.

Referring more particularly to Figs. 2 and 3, the reciprocating slide 21 may be provided with a rack 27 which meshes with a gear 28 secured to a shaft 29. Also secured to the shaft 29 is a pinion 30 which is driven by a gear 31 rotatably mounted on a shaft 32. Also mounted on the shaft 32 and rotating with the gear 31 is a pinion 33 which is operated by the internal segmental gear 34 carried by an arm 35 secured to a shaft 36 which is journaled in bearings on the frame 9. A second arm 37 may be secured to the shaft 36 and carries a roller 38 which is actuated by a cam 39 secured to the shaft 17. By these means the gathering device or receptacle may be projected into the furnace to gather a charge and be withdrawn from the furnace to a position over the spindle head or mold.

The suction gatherer which is designated generally by the reference numeral 23 comprises a supporting frame 40 which may be secured to the slide 21 in any suitable manner. A vertical opening or slide bearing 40a is provided in the frame 40 and in this opening there is slidably positioned a reciprocating plunger 105 having a cup-shaped lower portion similar to the plunger shown and described in Patent No. 1,609,691 mentioned above. This cup-shaped portion provides the upper cavity of the gathering receptacle which is completed by a lower portion 41. This bottom portion consists of two parts each having an arm 42 pivoted at 43 to lugs 44 integral with the supporting frame 40. The arms 42 have laterally extending arms 45 (see Fig. 2) connected together at 46 by means of a slot and pin joint so that the arms 45 are constrained to swing simultaneously in opposite directions about their pivots 43. One of the arms 42 may be provided with an extension 47 to which there is attached the lower end of a tension spring 48, the upper end of which is fastened to any suitable point 49 of the slide 21. The spring 48 thus tends to hold the two parts of the bottom mold cover in their closed position or in the position for completing the suction cup. Means are provided for moving the bottom cup portions out of the mold completing position by a projection or lug 55 on one of the arms 42. This lug is operated by a pin 56 carried by the plunger 105 which pin moves vertically downward with the plunger to open the bottom cup portions 41. A guide 57 is provided on the frame 39 in which the pin 56 slides.

Vacuum is applied at the cup or mold through a valve controlled cavity in the bottom of the plunger 105. As shown, the plunger is provided with a passage 106 extending horizontally from the side of the plunger to a central passage 106a, which latter passage is terminated by a stemmed valve 107 behind which is a spring 107a which tends to maintain the port 106a open. There is preferably provided a slight clearance between the plunger 105, at its lower end, and the opening 40a which may be effected by making this portion of the opening slightly larger, as at 40b. This permits a suction at the side of the cavity as well as at the top and assures a complete filling thereof. When the plunger 105 is in its upper position, the passage 106 is in communication with a passage 58 which, in turn, communicates through a valve 59 with a pipe 60 leading to a source of suction or partial vacuum (not shown) which may be of any suitable type.

The valve 59 controls the application and relief of vacuum at the suction cup and is operated by an arm 61 connected through a link 62 to an arm 63a of a bell crank lever 63 which is pivoted to the slide 21 at any suitable point, as at 64. The arms of the bell crank lever 63b and 63a are actuated by a pin 65 carried by the guide 20 to open and close the valve 59 to apply and relieve vacuum in the cup at suitable times as the slide 21 moves into and out of the gathering position.

As the suction cup is presented to the surface of the glass and vacuum is first applied, the valve 107 is held open by the spring 107a but is closed as the glass sucked up into the cup pushes the valve to its seat. As the suction device and the slide are moved inwardly toward the position over the spindle, the valve 59, controlling the application of vacuum, is moved to the cut-off position and air at sub-atmospheric pressure is trapped in the passages 58 and 106. When the cup has arrived at its delivery position and the plunger is moved downwardly to discharge and press the glass delivered to the machine, the vacuum is first broken as the port 106 passes below the supporting frame 39 and the spring behind the valve may tend to loosen the charge in the cavity of the plunger. Should this loosening action be excessive, air may be admitted through the passage 106 to the cavity above the loosened charge while the plunger is moving downward. In this event, the port 106 and the valve 107 serve, during the subsequent pressing operation, to provide a relief for this air, and in this respect the valve 107 acts similarly to the similar valve shown in the pressing plunger of the aforesaid Patent No. 1,609,691. After the pressing operation has been performed and the plunger starts its retractive movement, the spring acting upon the valve 107 tends to free the glass from the plunger and to prevent the sticking of the plunger thereof.

The supporting frame 40 may be provided with an annular duct or passage 66 in which a cooling fluid may be circulated.

The plunger 105 extends upward through the aperture 40a and is provided at its upper end with a hook 67 or other suitable connecting means. As shown in the drawings, the hook 67 is engaged by a pin 68 when the gathering mechanism is in the glass delivering position, which pin is carried by a vertically reciprocating member 69 sliding in the guide 70.

Vertical reciprocation of the member 69 and hence of the plunger 105 is accomplished by mechanism somewhat similar to that described in Patent No. 1,609,691 referred to above as reciprocating the press plunger and may comprise a cam lever 110 pivoted at one end to the bracket 95 mounted on the table 9. The cam lever 110 carries, intermediate its ends, a roller 111 and is oscillated by an upper cam 113 secured to the shaft 17 and a lower cam 112 secured to the shaft 11. The end of the lever 110 remote from the pivotal point is provided with an aperture 121 through which slidably passes a rod 122. The lower end of the rod 122 is pivoted at 123 to the reciprocating member 69 and at its upper end is provided with an adjustable nut 124 and a lock nut 125. A loose collar 126 may be slipped over the rod 122 to provide a bearing for the nut 124 which will permit the nut to rest against the collar above the level of the upper edge of the cam lever 110. A compression spring 127 surrounds the rod 122 and presses against the lever 110 at its upper end and against an adjustable stop 128 carried by the rod 122. Normally, the spring 127 presses the reciprocating member 69 downward until the nut 124 rests against the collar 126 and the lever 110. The cam lever 110 presses the member 69 downward through the spring 127 and moves it downwardly until the lower end of the member 69 rests against the upper surface of the frame 40 and further downward movement of member 69 is thereby prevented. Thereafter, the spring 127 is compressed and the lever 110 continues to press the reciprocating member 69 downward but without moving it, the operating connection being a yielding one.

A glass receiver 81 may be provided for cooperation with the neck ring 222 and operating mechanism for moving it into such cooperative relation prior to the downward movement of the plunger may be provided as follows: The receiver is mounted on a horizontal frame 82 (Fig. 5) carried by a piston rod 83 which reciprocates in a cylinder 92 which in turn is slidably mounted for vertical movement in a guide, not shown. The glass receiver 81 is provided with a central vertical aperture 87 that is coextensive with the height of the receiver. Surrounding the aperture 87 is an annular hollow chamber 88 which is formed in the walls of the receiver for the purpose of retaining a liquid for cooling. The piston rod 83 is actuated by the cylinder 92 (Fig. 2) which surrounds the piston of piston rod 83, the upper end of the cylinder being pivotally connected with the lower end of a link 93 (Fig. 1). The upper end of the link 93 is pivotally connected with one end of the cam lever 94. The other end of the cam lever 94 is pivoted to the bracket 95 on the frame 9. The middle portion of the cam lever 94 carries a roller operating between two cams, the upper one 98 being secured to the shaft 17 and the lower one (not shown) being secured to the shaft 11. Further and more complete description of this part of the mechanism may be found in Patent No. 1,609,691.

Shears 131 may be carried by a lever 132 pivoted at 133 to one arm of a bell crank lever 134, the bell crank lever being pivoted at 135 to a bracket 135a mounted on the frame 9. The other arm of the bell crank lever is engaged by an adjustable stud 136 threaded in an arm of the bracket 135a, the stud 136 being provided with a lock nut 137 for clamping it in its adjusted position. One end of a link 138 is pivoted to the lever 132 and the other end of the link 138 is pivotally connected with one end of a lever 139. The other end of the lever 139 is pivoted to the frame at 140 and at an intermediate portion carries a roller 141. The roller 141 is engaged by a cam 142 secured to the shaft 17. One end of a spring 143 is fastened to the lever 132 at 144 and the other end is secured to the frame at 145, and by this means the cam roller 141 is held against the cam 142. An adjustable stud 146 carried by the arm 132 may be used for operating the shears by permitting the stud to strike against a stationary arm 147 extending from the furnace wall. The shears are of any well known construction and are provided with suitable operating links, pivots and springs, so that when the stud 146 strikes the arm 147, the blades are closed, and as the stud is moved away from the arm, the blades are opened. Suitable means for cooling the shears while in their open position may be provided. Such means are well known and are not here shown or described.

The operation of the mechanism so far as is necessary for an understanding of the present invention is as follows: The rotation of the shaft 17 operates through the cam 39, roller 38, arm 37, shaft 36 and arm 35 with its internal gear 34 to rotate the intermeshing gears 33, 31, 30 and 28 to actuate the rack 27 to move the slide 21 together with the suction gathering mechanism 23 into the boot 24 and to a gathering position. As the bell crank lever 63 passes the pin 65, the lever is actuated by the pin to open the valve 59. It will be understood that in this position, the bottom cup portion 41 is in the position shown in Fig. 4. The opening of the valve 59 creates a vacuum within the suction device and a charge of glass is drawn into the cavity formed therein by the plunger 105 and the parts 41. Because of the location of the passage 106a at the upper portion of the cavity in the end of the plunger, the glass charge will fill the cavity to the very top, and because of the clearance at 40a, the charge will be drawn to the outer circumferential portion of the cavity, thus assuring the complete filling of the cavity in all directions. Further rotation of the shaft 17 and cam 39 causes retraction of the slide 21. On this movement, the bell crank lever 63 is moved by the pin 65 to close the valve 59 breaking the vacuum connection and trapping air at reduced pressure in the passages 58 and 106. When the suction cup reaches the position shown in dotted lines in Fig. 2, the shear mechanism is operated to cut off the thread of glass hanging from the charge in the suction device. The chilled portion of the glass which drops back into the furnace is prevented from passing back to the gathering station by the wall 26 until such chilled portion has been drawn under the surface of the glass and reheated.

After severance of the glass, the slide 21 continues its retractive movement until the glass gathering mechanism reaches a position over a spindle head and its neck ring 222 (Fig. 3). As the gathering device moves into position above the spindle head, the glass receiver 81 is moved into the position shown in Fig. 3 by means of the arm 82, piston rod 83, cylinder 92, link 93 and cam lever 94, in the manner described in the aforesaid Patent No. 1,609,691. The movement of slide 21 to its inner position completes the drive of the plunger 105 by the engagement of hook 67 and pin 68. The cams 112 and 113 now cause downward movement of the cam lever 110 to move the reciprocating member 69 and the plunger 105 downward. The first portion of this movement causes the bottom portions 41 of the cup to open through contact of pin 56 with lug 55 and permits the plunger and charge to be moved toward the spindle head. Further downward movement of the plunger carries the glass charge downward and into and through the glass receiver 81 and into the neck ring 222 and the mold, the plunger 105 continuing downward to press the glass into the neck ring and mold. Thus the charge of glass is delivered to the mold in the same vertical position in which it was gathered, and undesirable chilling thereof is avoided. Moreover, by eliminating the inversion of the charge in delivering it to the mold, I am enabled to produce glassware more economically and efficiently than has been possible heretofore in employing similar methods and apparatus. When the pressing operation is completed, the cams 112 and 113 cause retraction of the plunger, the valve 107 acting as described to aid in the disengagement of the plunger from the glass. The retraction of the plunger effects the closing of the bottom portions 41 of the gatherer through the urge of the spring 48. This places the gatherer in readiness for the collection of another charge.

The charge pressed as above stated is further shaped as described in the Patent 1,609,-691, the particular spindle head moving away from the charging station and an empty head moving thereinto.

It will be seen that simple, effective and compact means have been provided for transferring charges of glass from a glass furnace to a mold where the charge is pressed, which operate to transfer the charge and press it in the minimum time and with the least change in form and condition during the transferring operation. The arrangement reduces undesirable chilling effects upon the charge.

It is to be understood that the above described embodiment of the invention is for the purpose of illustration only and various changes may be made therein without departing from the spirit and scope of the invention as defined in the appended claims.

1. In glass working mechanism, a mold, a member adapted to gather a charge of glass from a gathering pool by suction, and means for causing said member to deliver the charge to said mold and to engage and press the charge of glass in said mold.

2. Glass working machinery comprising a receptacle for a supply of molten glass, a mold, a unitary gathering and pressing device, and means for actuating said device to gather a charge of glass therein by suction from the surface of the glass in said receptacle, to deliver such charge to the mold, and to press the charge so delivered to said mold by direct contact therewith.

3. Glass working apparatus comprising a receptacle for a supply of molten glass, a mold, a plunger having a glass receiving and shaping cavity therein, means for moving said plunger into cooperative glass pressing relation with said mold, means for moving said plunger to a glass gathering station in said receptacle, means for creating a vacuum within said cavity, to draw a charge of glass upwardly into said cavity from the surface of the glass in said receptacle, and means for actuating said plunger after it has been moved into glass pressing relation with said mold, to press the gathered charge of glass in said mold.

4. In glass working machinery, in combination, a receptacle for a supply of molten glass, a mold adapted to impart a finish to at least a part of the ware, a member constituting both a suction gathering device and a pressing plunger, means for moving said member into and out of contact with said molten glass, means for applying suction above the glass in the receptacle through said member when said member is in contact with the glass to gather a charge therein, means for moving the member into alignment with said mold to deliver a charge thereto, and means for reciprocating said member to press the charge of glass in the mold.

5. In combination with a glass fabricating machine and a glass melting tank, a combined suction gathering head and blank pressing mechanism, said mechanism, including a plunger member provided with a cavity for the reception of glass therein, means for moving said member into and out of contact with the glass in said tank, means for creating a vacuum in said cavity when said member is in contact with the glass to gather a charge in said cavity, a mold, means for moving said member into a position to deliver the charge of glass therein to said mold, means for imparting a pressing movement to said member to press the charge in said mold, and means for alternately connecting the two last named means to said member.

6. Glass working apparatus comprising a mold, a supporting frame, a plunger slidably mounted in said frame, the lower end of said plunger having a glass receiving cavity therein, means cooperating with said plunger to form a gathering receptacle, means for moving said cooperating means into and out of cooperative position with the plunger, means for creating a vacuum within the gathering receptacle to gather a charge of glass therein from the surface of a gathering pool, and means for moving said plunger relative to said cooperating means into cooperative glass pressing relation with said mold, 7. Glass working apparatus comprising a mold, a supporting frame, a pressing plunger slidably mounted in said frame and having a glass receiving cavity therein, means cooperating with said plunger to form a gathering receptacle, means for normally holding said cooperative means in receptacle completing position, means moving the receptacle into contact with a pool of glass to gather a charge therein, and means for moving said plunger into glass pressing relation with said mold and said cooperative means out of receptacle completing position.

8. Glass working machinery comprising a mold, a suction gathering head having a supporting frame with an opening therein, a pressing plunger having a cup-shaped glass receiving and shaping portion, said plunger being slidably mounted in said opening and being constantly held in vertical position by said frame, means for moving said frame and plunger into position to gather a charge of glass from the surface of a gathering pool, means for creating a vacuum within said cup-shaped portion to collect a charge of glass therein from said pool, and means for moving the plunger to deliver the glass so collected into said mold, and means for actuating said plunger to press the gathered glass in said mold.

9. In glass working apparatus, a neck mold adaped to be moved intermittently into a charging position, a suction gathering device located at the charging position, said device comprising divided bottom sections and an upper section wherein a charge may be gathered, said upper section being formed in a pressing plunger adapted to press a charge of glass in the neck mold, means for moving said gathering device into a position to gather a charge of glass from a gathering pool, means for applying a vacuum to the gathering mechanism through said upper section, and means for moving said section to press the glass in the mold.

10. A suction gathering head, comprising a supporting frame having an opening therein, a pressing plunger slidably mounted in said opening and having a glass receiving cavity therein to provide the upper portion of a gathering receptacle, a member pivoted to said frame for completing said gathering receptacle, means for moving said plunger into cooperative pressing relation with a mold, and connections between said plunger and said member for moving the latter out of receptacle completing position during the movement of the former into pressing position.

11. In glass working machinery, a mold, a vertically reciprocating member positioned above said mold, a guide extending transversely of said member, a gathering receptacle frame slidably carried by said guide, a pressing plunger vertically slidable in said frame, means for moving said frame between a position beneath said reciprocating member and a glass gathering position, and detachable connecting means between said reciprocating member and said plunger through which the plunger may be moved into cooperative glass pressing relation with said mold.

12. Apparatus for gathering and transferring a glass charge by suction from a glass supply to a mold, comprising a guide, a slide operating in said guide, a supporting frame secured to said slide, a plunger slidably mounted for vertical movement in said frame and having a cup-shaped portion, connections for creating a vacuum in said cup-shaped portion to effect the collection of glass therein and having a valve therein, means for operating said valve by the movement of the slide into and out of the glass gathering position, and means effective when the frame is out of gathering position for vertically reciprocating the plunger.

13. Apparatus for transferring a glass charge to a mold, comprising a gathering head supporting frame having an aperture therethrough, a pressing plunger slidably mounted in said aperture and having a suction mold portion at its lower end and a hooked portion at its upper end, means for moving said frame and plunger from a glass gathering position to a position above said mold, an actuating member having means for engaging said hook, and yielding means for moving said actuating member and said plunger into cooperative relation with said first named mold and for applying pressure to said plunger.

14. In a suction gathering mechanism, a supporting frame, a member movable therein having a glass receiving and shaping cavity, means for moving said supporting frame and member into gathering position above a pool of glass, suction means for drawing a charge of glass from said pool into the cavity in said member, means for moving said frame adjacent to a glass forming unit, and means for actuating said movable member to transfer the charge from said gathering mechanism to said forming unit and to press said glass in the forming unit into a desired configuration while still in contact with said member.

15. A suction gathering mechanism, comprising a supporting frame having a vertically disposed aperture therein, a vertically movable member constantly held in vertical position in said aperture and having at its lower end a cup-shaped portion for the reception of a glass charge, said member having a suction passage opening into said cup-shaped portion, whereby a charge of glass may be drawn upwardly into said portion from the surface of a gathering pool, and means for moving said member to transfer the charge to a glass forming unit and to form it therein while in contact with said member and for simultaneously connecting said suction passage with the atmosphere.

16. A suction gathering mechanism, comprising a supporting frame having a vertically disposed aperture therein, a vertical member movable in said aperture and having a glass receiving cavity therein, means cooperating with said member to form a gathering receptacle, said member having a suction port therein opening into said gathering receptacle, whereby a charge of glass may be drawn upwardly into said cavity from the surface of a gathering pool, and means for moving said member to transfer the charge to a glass forming unit and to form it therein while in contact with said member and for simultaneously moving said cooperating means away from said vertical member and connecting said suction port with the atmosphere.

17. The process of forming glass blanks for further fabrication into glassware, which comprises filling a gathering device with a charge of glass from the surface of a gathering pool by suction, introducing the charge of glass into a mold and pressing the glass in said mold by the gathering device to form a blank.

18. In a process of forming glassware, the steps of gathering a charge of glass from the surface of a gathering pool by suction into a hollow pressing member, introducing the charge into a mold and thereafter moving the pressing member to press the charge in said mold.

19. The process of forming glassware, which comprises gathering a charge of glass from the surface of a gathering pool by suction, transferring the charge so gathered to a pressing mold while maintaining it in the same vertical position in which it was gathered, and pressing the charge in said mold by the means used for gathering and transferring the charge.

Signed at Hartford, Connecticut, this 6th day of June, 1928.

ROBERT W. CANFIELD.